A. W. HOFFMAN.
CALIPERS.
APPLICATION FILED FEB. 10, 1921.

1,420,700.

Patented June 27, 1922.
2 SHEETS—SHEET 1.

Inventor.
Alfred W. Hoffman,
By Frederick V. Winters,
Attorney.

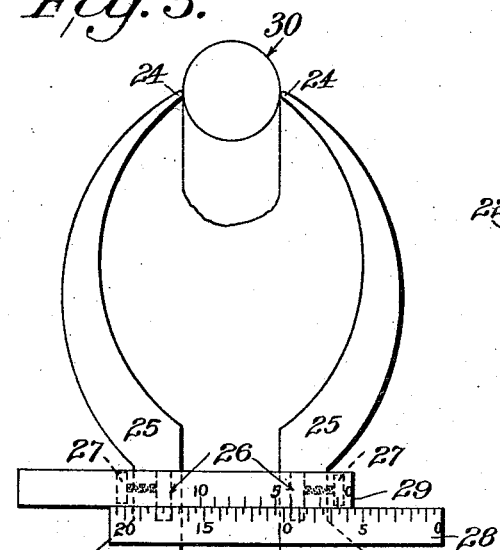
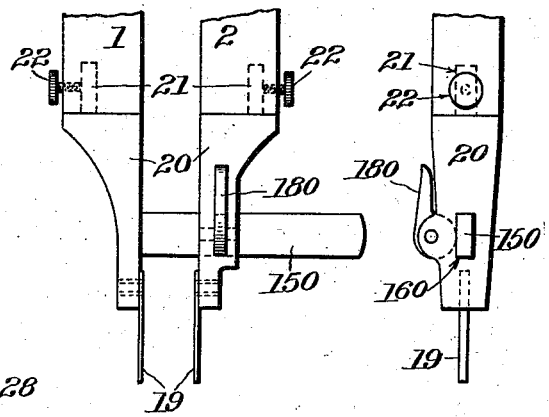
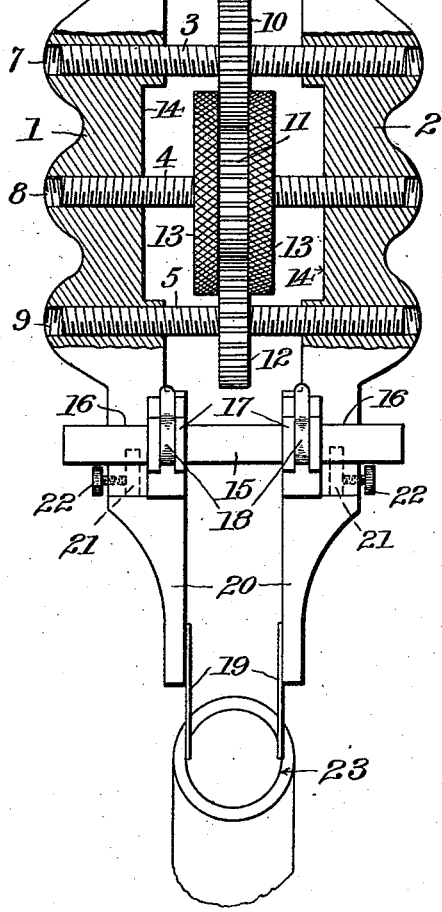
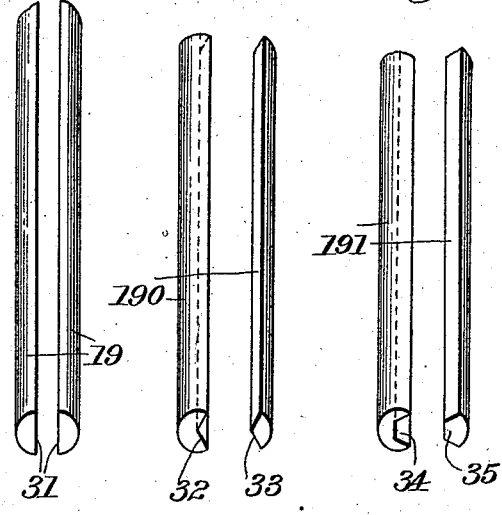

UNITED STATES PATENT OFFICE.

ALFRED W. HOFFMAN, OF NEW YORK, N. Y.

CALIPERS.

1,420,700. Specification of Letters Patent. Patented June 27, 1922.

Application filed February 10, 1921. Serial No. 443,837.

*To all whom it may concern:*

Be it known that I, ALFRED W. HOFFMAN, a citizen of the United States, residing at New York, in the county of Bronx and State of New York, have invented certain new and useful Improvements in Calipers, of which the following is a full, clear, and exact specification.

This invention relates to calipers and has for one of its objects to provide a measuring instrument of this kind by which an external diameter may be determined from a corresponding internal diameter, or an internal diameter determined from a corresponding external diameter.

The invention contemplates the provision of parallel members adapted to be moved toward and away from each other in parallelism and having a pair of arms at one end for making external measurements, and a pair of arms at the other end for making corresponding internal measurements. Thus, if one piece of work is to be made to fit within another, it is only necessary to set the calipers so that its internally measuring arms fit the outer piece of work, and the external measuring arms at the other end of the instrument will be set for the proper external measurement of the inner piece of work. In the same way, the proper internal diameter of an outer piece of work may be determined from the measurement of the external diameter of an inner piece of work over which said outer piece of work is to be made to fit.

Another object is to provide improved means for maintaining the parallel members of the calipers in parallelism during adjustments. A further object is to provide improved means for adjusting said parallel members, and another object is to provide for locking said members in any desired adjustment. Other objects will appear as the description proceeds.

The invention will be first hereinafter described in connection with the accompanying drawings which constitute part of this specification, and then more specifically defined in the claims at the end of the description.

In the accompanying drawings, wherein similar reference characters are used to designate corresponding parts throughout the several views:

Figure 3 is a broken front elevation of the calipers set to measure the internal and external diameters of interfitting pieces of work.

Figure 4 is a detailed front view of the lower portion of the calipers, showing a modified form of guiding and locking device.

Figure 5 is a side view of the parts shown in Figure 4.

Figures 6, 7 and 8 are detailed perspective views of different forms of internally measuring arms adapted to interfit when in contact with each other so as to form a cylindrical rod of the smallest desired diameter.

Figure 1:
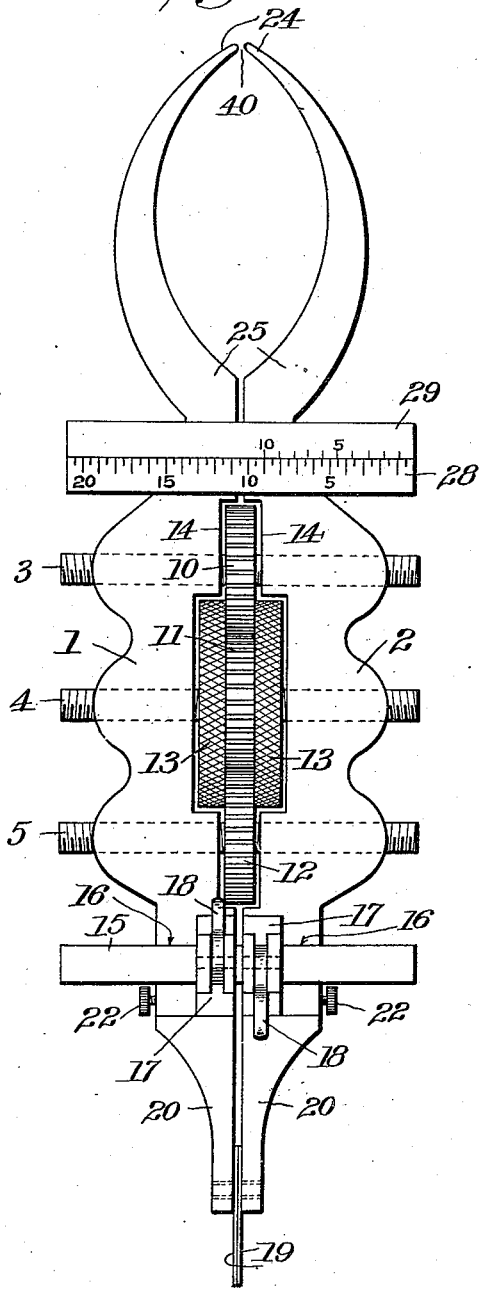
Figure 1 is a front elevation of a pair of calipers constructed substantially in accordance with this invention and shown in collapsed position where the internally measuring arms are in contact with one another and adapted to measure the smallest internal diameter, while the external arms are spaced apart a distance corresponding to the diameter of said contacting internally measuring arms.

The calipers comprise parallel members 1 and 2, the middle portions of which are connected by adjusting screws 3, 4 and 5, each of which has oppositely threaded end portions fitting correspondingly threaded passages in said parallel members, as at 7, 8 and 9 in Figure 3. Said adjusting screws have central gears 10, 11 and 12 which are of the same diameter and intermesh with one another. The middle screw 4 has enlarged milled flanges 13 at the sides of its gear 11, said flanges overlapping the gears 10 and 12 of the other screws and serving to maintain them in proper alignment. Said milled flanges 13 also serve as operating means for rotating all of the screws simultaneously to adjust the members 1 and 2 at different distances apart. It will be noted that the gears and milled flanges of the screws are arranged between the parallel members 1 and 2 of the instrument, and that the inner edges of said members are cut away, as at 14, to clear said parts when the calipers are collapsed, as shown in Figure 1.

A transverse bar 15 is arranged in grooves 16 of the members 1 and 2 for preventing one member from getting out of parallelism with the other during adjustment. Brackets 17 are secured to said members to bridge the cross bar 15 for retaining it in its grooves 16, and clamps 18 are carried by said brackets for locking the calipers in any set position. In practice, one of the clamps 18 is kept in clamping position so as to hold one end of the cross bar 15 rigidly in engagement with one of the parallel members of the calipers while the other clamp is in released position during adjustments, as shown in Figure 1. After the desired adjustment has been reached, the second clamp is operated, as shown in Figure 3, to hold said adjustment.

Internally measuring arms 19 are carried by end pieces 20 which are detachably secured to corresponding ends of the parallel members 1 and 2 in any suitable manner, as by the tongues 21 on said end pieces engaging corresponding sockets in said parallel members and retained in place by set screws 22. Externally measuring arms 25 are detachably secured to the other ends of said parallel members in the same manner, as by tongues 26 locked by set screws 27. Said arms 25 are preferably bowed and tapered to their ends 24 which are adapted to engage the outside of a piece of work 30, Figure 3, while the arms 19 are adapted to fit the internal diameter of the socket of a piece of work 23 which is adapted to fit over the piece of work 30.

Co-acting scales or verniers 28 and 29 are secured, respectively, to the parallel members 1 and 2 for measuring the distance between said members. Any other suitable measuring scales may be substituted, if desired.

As shown in Fig. 6 the internally measuring arms 19 may be semi-cylindrical in cross section, having straight contacting faces 31, so that when said arms are brought into contact with each other, as indicated in Figure 1, they will together form a cylindrical rod of the smallest desired diameter capable of measuring a socket of minimum size. The internally measuring arms may be made in any other suitable form, as long as they together form a cylindrical rod when brought into contact with each other. As shown in Figure 7, internally measuring arms 190 are provided respectively with a V-shaped groove 32 and an interfitting V-shaped rib 33. In Figure 8, internally measuring arms 191 have an interfitting groove 34 and rib 35, respectively, of another form.

Figure 2:
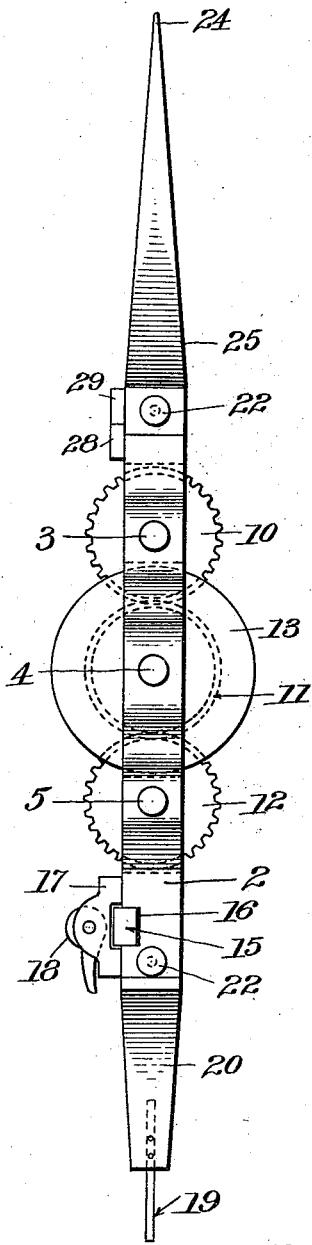
Figure 2 is a side elevation of the instrument.

As shown in Figures 4 and 5, a guiding bar 150 may be permanently fastened to one of the end pieces 20 and extended through a slot 160 in the other one of said end pieces to further aid in maintaining the parallel members 1 and 2 in precise parallelism during adjustment. Said bar 150 may be used in addition to the cross bar 15, Figures 1, 2 and 3, or, if desired, a clamp 180 may be employed in conjunction with said bar 150, for locking the members 1 and 2 in adjusted position, and the cross bar 15 omitted.

I claim:

1. In calipers, the combination with parallel members, of means for adjusting said members toward and away from each other, a cross bar extending from one member across the other, there being a groove in said last mentioned member to fit said cross bar for maintaining said members in parallelism during adjustment, and a bracket bridging said groove for retaining the cross bar therein.

2. In calipers, the combination with parallel members, of means for adjusting said members toward and away from each other, a cross bar extending from one member across the other, there being a groove in said last mentioned member to fit said cross bar for maintaining said members in parallelism during adjustment, a bracket bridging said groove, and a clamp carried by said bracket for engaging the cross bar to lock the calipers in adjusted position.

3. In calipers, the combination with parallel members having notches in their adjacent faces, of a plurality of screws for adjusting said members toward and away from each other, and intermeshing gears of the same size fast on said screws for causing them to rotate in unison, said gears being arranged in said notches when the parallel members are brought together.

4. In calipers, the combination with parallel members, of three screws for adjusting said members toward and away from each other, intermeshing gears of the same size fast on said screws for causing them to rotate in unison, and flanges on the middle screw extending at both sides of its gear and overlapping the intermeshing gears of the adjacent screws for maintaining said gears in alignment.

5. In calipers, the combination with parallel members, of three screws for adjusting said members toward and away from each other, intermeshing gears of the same size fast on said screws for causing them to rotate in unison, and flanges on the middle screw extending at both sides of its gear and overlapping the intermeshing gears of the adjacent screws for maintaining said gears in alignment, the peripheries of said flanges being roughened for the purpose specified.

6. In calipers, the combination with parallel members, of a plurality of screws for adjusting said members towards and away from each other, and intermeshing gears of the same size fast on said screws for causing them to rotate in unison, and flanges on one screw extending at the sides of its gear and overlapping the intermeshing gear of the adjacent screw for maintaining said gears in alignment, said gears and flanges being arranged between the parallel members of the calipers, the latter having recesses to clear said parts.

In testimony whereof I have signed my name to this specification.

ALFRED W. HOFFMAN.